United States Patent
Ishiguro

(10) Patent No.: US 10,281,618 B2
(45) Date of Patent: May 7, 2019

(54) POLARIZING PLATE AND IMAGE DISPLAY DEVICE

(71) Applicant: FUJIFILM Corporation, Tokyo (JP)

(72) Inventor: Makoto Ishiguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 361 days.

(21) Appl. No.: 15/092,051

(22) Filed: Apr. 6, 2016

(65) Prior Publication Data

US 2016/0223719 A1   Aug. 4, 2016

Related U.S. Application Data

(63) Continuation of application No. PCT/JP2014/077053, filed on Oct. 9, 2014.

(30) Foreign Application Priority Data

Oct. 9, 2013 (JP) ................. 2013-212188
Dec. 25, 2013 (JP) ................. 2013-267617

(51) Int. Cl.
G02B 13/14 (2006.01)
B32B 7/02 (2019.01)
(Continued)

(52) U.S. Cl.
CPC .............. G02B 1/14 (2015.01); B32B 7/02 (2013.01); B32B 27/06 (2013.01); B32B 27/308 (2013.01);
(Continued)

(58) Field of Classification Search
CPC .......... G02B 5/30; G02B 5/208; G02B 5/305; G02B 5/3025; G02B 5/3033;
(Continued)

(56) References Cited

U.S. PATENT DOCUMENTS

2012/0107530 A1 *  5/2012  Morishima ............ B41M 3/008
                                                      428/32.31

FOREIGN PATENT DOCUMENTS

JP       2006309120 A   *  11/2006
JP       2011-221185 A     11/2011

OTHER PUBLICATIONS

International Preliminary Report on Patentability issued by WIPO dated Apr. 21, 2016, in connection with International Patent Application No. PCT/JP2014/077053.
(Continued)

*Primary Examiner* — Mustak Choudhury
(74) *Attorney, Agent, or Firm* — Edwards Neils, LLC; Jean C. Edwards, Esq.

(57) ABSTRACT

Provided are a polarizing plate having excellent surface hardness and excellent adhesiveness between a polarizer and a resin layer arranged on the polarizer, and an image display device including the polarizing plate. The polarizing plate of the present invention includes a polarizer and a resin layer directly in contact with the polarizer, the resin layer is a layer obtained by polymerizing and curing a boronic acid monomer having a boronic acid group denoted by Formula (1) and a polymerizable group, and a multifunctional monomer, Re(550) and Rth(550) of the resin layer respectively satisfy Expression (X) and Expression (Y) described below, and the thickness of the polarizer is less than or equal to 35 μm. Expression (X) Re(550)≤10 nm and $|Rth(550)| \leq 10$ nm    Expression (Y)

(Continued)

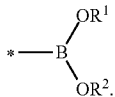

Formula (1)

17 Claims, 1 Drawing Sheet

(51) Int. Cl.
*G02B 1/14* (2015.01)
*G02B 5/30* (2006.01)
*B32B 27/06* (2006.01)
*B32B 27/30* (2006.01)
*G02B 5/20* (2006.01)
*C08F 230/06* (2006.01)
*C08F 222/10* (2006.01)
*G02F 1/1335* (2006.01)

(52) U.S. Cl.
CPC ............ *G02B 5/208* (2013.01); *G02B 5/3025* (2013.01); *G02B 5/3033* (2013.01); *G02B 5/3083* (2013.01); *B32B 2307/42* (2013.01); *B32B 2307/536* (2013.01); *B32B 2307/71* (2013.01); *B32B 2457/20* (2013.01); *C08F 222/1006* (2013.01); *C08F 230/06* (2013.01); *G02F 1/133528* (2013.01); *G02F 2201/50* (2013.01)

(58) Field of Classification Search
CPC .......... G02B 5/3083; G02B 1/14; G02B 7/02; G02B 27/06; G02B 27/26; G02B 27/308; G02F 1/1335; G02F 1/13363; G02F 1/133528; G02F 1/133516; G02F 1/133634; B32B 7/02; B32B 27/308; B29B 9/12; B29C 47/0021; B29C 47/8845; B29C 47/8895; B41M 5/405; B41M 5/502
USPC ............... 359/242, 251, 277, 352, 437, 463, 359/485.03, 485.04; 428/32.31
See application file for complete search history.

(56) References Cited

OTHER PUBLICATIONS

International Search Report issued in PCT/JP2014/077053 dated Nov. 18, 2014.

\* cited by examiner

POLARIZING PLATE AND IMAGE DISPLAY DEVICE

CROSS-REFERENCE TO RELATED APPLICATIONS

This application is a Continuation of PCT International Application No. PCT/JP2014/077053 filed on Oct. 9, 2014, which was published under PCT Article 21(2) in Japanese, and which claims priority under 35 U.S.C. § 119(a) to Japanese Patent Application No. 2013-212188 filed on Oct. 9, 2013 and Japanese Patent Application No. 2013-267617 filed on Dec. 25, 2013. The above applications are hereby expressly incorporated by reference, in their entirety, into the present application.

BACKGROUND OF THE INVENTION

1. Field of the Invention

The present invention relates to a polarizing plate, and in particular, the present invention relates to a polarizing plate including a resin layer formed by polymerizing and curing a boronic acid monomer and a multifunctional monomer, and an image display device including the polarizing plate.

2. Description of the Related Art

In general, a polarizer has low mechanical strength, and thus, has been used as a polarizing plate by bonding a polarizer protective film such as a film formed of triacetyl cellulose which is subjected to a saponification treatment to the polarizer.

On the other hand, recently, in the polarizer protective film, improvement in various performances such as improvement in mechanical strength has been required, and various proposals have been made. For example, in JP2011-221185A, a polarizing plate is disclosed in which a curable resin layer formed of a curable resin composition containing a multifunctional (meth)acrylic monomer is directly formed on the surface of a polarizer. According to this polarizing plate, adhesiveness between the polarizer and the curable resin layer is high, and surface hardness is also excellent.

SUMMARY OF THE INVENTION

On the other hand, a thinner polarizer has been required, and further improvement in surface hardness of the polarizing plate and further improvement in adhesiveness between the polarizer and the polarizer protective film have been required according to the expansion of applications of image display devices such as a liquid crystal display device or an organic EL display device.

The present inventors have conducted studies about properties of the polarizing plate including the curable resin layer disclosed in JP2011-221185A, and thus, have found that the adhesiveness between the polarizer and the curable resin layer does not satisfy the levels required these days and further improvement is required.

In consideration of the circumstances described above, an object of the present invention is to provide a polarizing plate having excellent surface hardness and excellent adhesiveness between a polarizer and a resin layer arranged on the polarizer.

In order to attain the object described above, the present inventors have conducted intensive studies, and thus, have found that the object described above is able to be attained by using a predetermined boronic acid monomer, and have completed the present invention.

That is, the present inventors have found that the object described above is able to be attained by the following configurations.

(1) A polarizing plate including a polarizer; and a resin layer directly in contact with the polarizer, in which the resin layer is a layer obtained by polymerizing and curing a boronic acid monomer having a boronic acid group denoted by Formula (1) described below and a polymerizable group, and a multifunctional monomer, Re(550) and Rth(550) of the resin layer respectively satisfy Expression (X) and Expression (Y) described below, and $Re(550) \leq 10$ nm  Expression (X)

$|Rth(550)| \leq 10$ nm  Expression (Y)

a thickness of the polarizer is less than or equal to 35 μm.

(Here, Re(550) indicates in-plane retardation (nm) at a wavelength of 550 nm, and Rth(550) indicates retardation (nm) in a thickness direction at a wavelength of 550 nm.)

(2) The polarizing plate according to [1], in which a mass ratio of the boronic acid monomer to the total mass of the boronic acid monomer and the multifunctional monomer (a mass of the boronic acid monomer/(the total mass of the boronic acid monomer and the multifunctional monomer)) is 0.005 mass % to 11.0 mass %.

(3) The polarizing plate according to [1] or [2], in which the polymerizable group included in the multifunctional monomer is a (meth)acryloyl group.

(4) The polarizing plate according to any one of [1] to [3], in which the resin layer further contains an ultraviolet absorbent.

(5) The polarizing plate according to any one of [1] to [4], in which maximum transmittance of the resin layer at a wavelength of 300 nm to 380 nm is less than or equal to 15%.

(6) The polarizing plate according to any one of [1] to [4], in which the polarizing plate further includes a polarizer protective film on a surface of the polarizer on a side opposite to the resin layer side, and maximum transmittance of the polarizer protective film at a wavelength of 300 nm to 380 nm is less than or equal to 15%.

(7) An image display device including the polarizing plate according to any one of [1] to [6].

(8) The image display device according to [7], in which the image display device is a liquid crystal display device.

According to the present invention, it is possible to provide a polarizing plate having excellent surface hardness and excellent adhesiveness between a polarizer and a resin layer arranged on the polarizer.

DESCRIPTION OF THE PREFERRED EMBODIMENTS

Hereinafter, the present invention will be described in detail. Further, herein, a numerical range denoted by using "to" indicates a range including numerical values before and after "to" as the lower limit value and the upper limit value.

Examples of a characteristic point of the present invention include a point in which a layer obtained by polymerizing and curing a predetermined boronic acid monomer and a multifunctional monomer is arranged to be directly in contact with the surface of a polarizer.

In the present invention, a mechanism of obtaining a desired effect is assumed as follows. In the present invention, the boronic acid monomer and the multifunctional monomer is directly polymerized and cured on the polarizer, first, the boronic acid monomer forms a bond with the polarizer through the boronic acid group, and is unevenly distributed on the surface of the polarizer. Next, at the time of polymerizing and curing, a polymerizable group in the multifunctional monomer reacts with a polymerizable group in the boronic acid monomer which is bonded to the polarizer. That is, it is considered that the boronic acid monomer is bonded to both of the polarizer and the multifunctional monomer in the resin layer, and a function of increasing adhesiveness between the polarizer and the resin layer is obtained.

Figure 1:
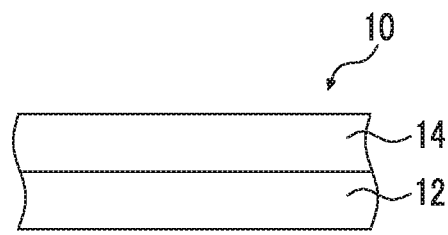
FIG. 1 is a sectional view of one embodiment of a polarizing plate of the present invention.

Hereinafter, one embodiment of a polarizing plate of the present invention will be described with reference to the drawings. FIG. 1 illustrates a sectional view of one embodiment of the polarizing plate of the present invention. Further, the drawing of the present invention is a schematic view, and a relationship between thicknesses of respective layers, a position relationship, or the like is not necessarily coincident with the actual relationship. The same applies to the following drawings.

A polarizing plate 10 includes a polarizer 12 and a resin layer 14. As illustrated in FIG. 1, the resin layer 14 is directly arranged on the surface of the polarizer 12, and functions as a polarizer protective film.

Hereinafter, each member of the polarizing plate (the polarizer and the resin layer) will be described below.

<Polarizer>

The polarizer may be a member having a function of converting light into specific linearly polarized light, and an absorptive type polarizer and a reflective type polarizer are able to be used.

An iodine-based polarizer, a dye-based polarizer using a dichromatic dye, a polyene-based polarizer, and the like are used as the absorptive type polarizer. The iodine-based polarizer and the dye-based polarizer are a coating type polarizer and a stretching type polarizer, any one of them is able to be applied, and a polarizer which is prepared by allowing polyvinyl alcohol to adsorb iodine or a dichromatic dye, and by performing stretching is preferable.

In addition, examples of a method of obtaining a polarizer by performing stretching and dyeing in a state of a laminated film in which a polyvinyl alcohol layer is formed on a substrate are able to include methods disclosed in JP5048120B, JP5143918B, JP5048120B, JP4691205B, JP4751481B, and JP4751486B, and known technologies related to these polarizers are able to be preferably used.

A polarizer in which thin films having different birefringence are laminated, a wire grid type polarizer, a polarizer in which a cholesteric liquid crystal having a selective reflection range and a ¼ wavelength plate are combined, and the like are used as the reflective type polarizer.

Among them, a polarizer containing a polyvinyl alcohol-based resin (a polymer including —$CH_2$—CHOH— as a repeating unit, in particular, at least one selected from the group consisting of polyvinyl alcohol and an ethylene-vinyl alcohol copolymer) is preferable from the viewpoint of more excellent adhesiveness with respect to the resin layer described below.

The thickness of the polarizer is less than or equal to 35 μm, is preferably 3 μm to 25 μm, and is more preferably 4 μm to 15 μm, from the viewpoint of excellent handleability and excellent optical properties. According to the thickness described above, it is possible to cope with the thinning of an image display device.

<Resin Layer>

The resin layer (a curable resin layer) is a layer which protects the polarizer and imparts mechanical strength to the polarizing plate. Further, in FIG. 1, the resin layer 14 is arranged only on one surface of the polarizer 12, and may be arranged on both surfaces.

The resin layer is a layer which is directly in contact with the polarizer, and is a layer obtained by polymerizing and curing a boronic acid monomer having a boronic acid group denoted by Formula (1) and a polymerizable group, and a multifunctional monomer. In addition, the resin layer exhibits optical isotropy.

Hereinafter, first, a raw material of the resin layer (the boronic acid monomer, the multifunctional monomer, and the like) will be described in detail, and after that, a manufacturing procedure or the like of the resin layer will be described in detail.

(Boronic Acid Monomer)

The boronic acid monomer is a compound having a boronic acid group denoted by Formula (1) and a polymerizable group, and as described above, has a function of increasing adhesiveness between the polarizer and the resin layer.

Formula (1)

In Formula (1), $R^1$ and $R^2$ each independently represent a hydrogen atom, a substituted or unsubstituted aliphatic hydrocarbon group, an aryl group, or a heterocyclic group.

Examples of the aliphatic hydrocarbon group include a substituted or unsubstituted straight chain or branched alkyl group having 1 to 20 carbon atoms (for example, a methyl group, an ethyl group, an iso-propyl group, and the like), a substituted or unsubstituted cyclic alkyl group having 3 to 20 carbon atoms (for example, a cyclohexyl group, and the like), and an alkenyl group having 2 to 20 carbon atoms (for example, a vinyl group, and the like).

Examples of the aryl group include a substituted or unsubstituted phenyl group having 6 to 20 carbon atoms (for example, a phenyl group, a tolyl group, and the like), a substituted or unsubstituted naphthyl group having 10 to 20 carbon atoms, and the like.

The heterocyclic group is a substituted or unsubstituted group having a 5-membered ring or a 6-membered ring which includes at least one hetero atom (for example, a nitrogen atom, an oxygen atom, a sulfur atom, and the like), and examples of the heterocyclic group include a pyridyl group, an imidazolyl group, a furyl group, a piperidyl group, a morpholino group, and the like.

$R^1$ and $R^2$ may be connected to each other to form a ring, and for example, isopropyl groups of $R^1$ and $R^2$ may be connected to each other to form a 4,4,5,5-tetramethyl-1,3,2-dioxaborolane ring.

In Formula (1), the hydrogen atom, the straight chain or branched alkyl group having 1 to 3 carbon atoms, and the ring formed by connecting $R^1$ and $R^2$ to each other are preferable as $R^1$ and $R^2$, and the hydrogen atom is particularly preferable.

In Formula (1), * represents a bonding position.

Further, the number of boronic acid groups denoted by Formula (1) is not particularly limited, and one boronic acid group may be included, or a plurality of (two or more) boronic acid groups may be included.

Further, one or more hydrocarbon groups included in the aliphatic hydrocarbon group, the aryl group, and the heterocyclic group may be substituted with an arbitrary substituent group. Examples of the type of substituent group include a substituent group disclosed in paragraph "0046" of JP2013-054201A.

The type of polymerizable group is not particularly limited, and examples of the type of polymerizable group include a radical polymerizable group, a cation polymerizable group, and the like. Examples of the radical polymerizable group include a (meth)acryloyl group, an acryl amide group, a vinyl group, a styryl group, an allyl group, and the like. Examples of the cation polymerizable group include a vinyl ether group, an oxiranyl group, an oxetanyl group, and the like. Among them, the (meth)acryloyl group, the styryl group, the vinyl group, the oxiranyl group, or the oxetanyl group is preferable, the (meth)acryloyl group or the styryl group is more preferable, or the (meth)acryloyl group is particularly preferable.

Further, the (meth)acryloyl group is the concept including both of an acryloyl group and a methacryloyl group.

The number of polymerizable groups is not particularly limited, and one polymerizable group may be included, or a plurality of (two or more) polymerizable groups may be included.

The molecular weight of the boronic acid monomer is not particularly limited, and is preferably 120 to 1200, and is more preferably 180 to 800, from the viewpoint of excellent compatibility with respect to the multifunctional monomer.

Examples of a preferred embodiment of the boronic acid monomer include a boronic acid monomer denoted by Formula (2) from the viewpoint of more excellent adhesiveness between the polarizer and the resin layer.

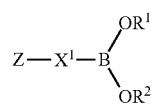

Formula (2)

The definition of $R^1$ and $R^2$ of Formula (2) is as described above.

Z represents a polymerizable group. The definition of the polymerizable group is as described above.

$X^1$ represents a single bond or a divalent linking group. Examples of the divalent linking group include —O—, —CO—, —NH—, —CONH—, —OCONH—, —COO—, —O—COO—, an alkylene group, an arylene group, a heterocyclic group (a hetero arylene group), and a divalent linking group selected from a combination thereof.

Further, examples of the combination include -arylene group-La-arylene group-La-arylene group-La-alkylene group-, -arylene group-La-arylene group-La-alkylene group-, -arylene group-La-alkylene group-, and the like. La represents —COO—, —CO—NH—, —O—, or —OCONH—.

Hereinafter, a specific example of the boronic acid monomer will be described, but the present invention is not limited thereto.

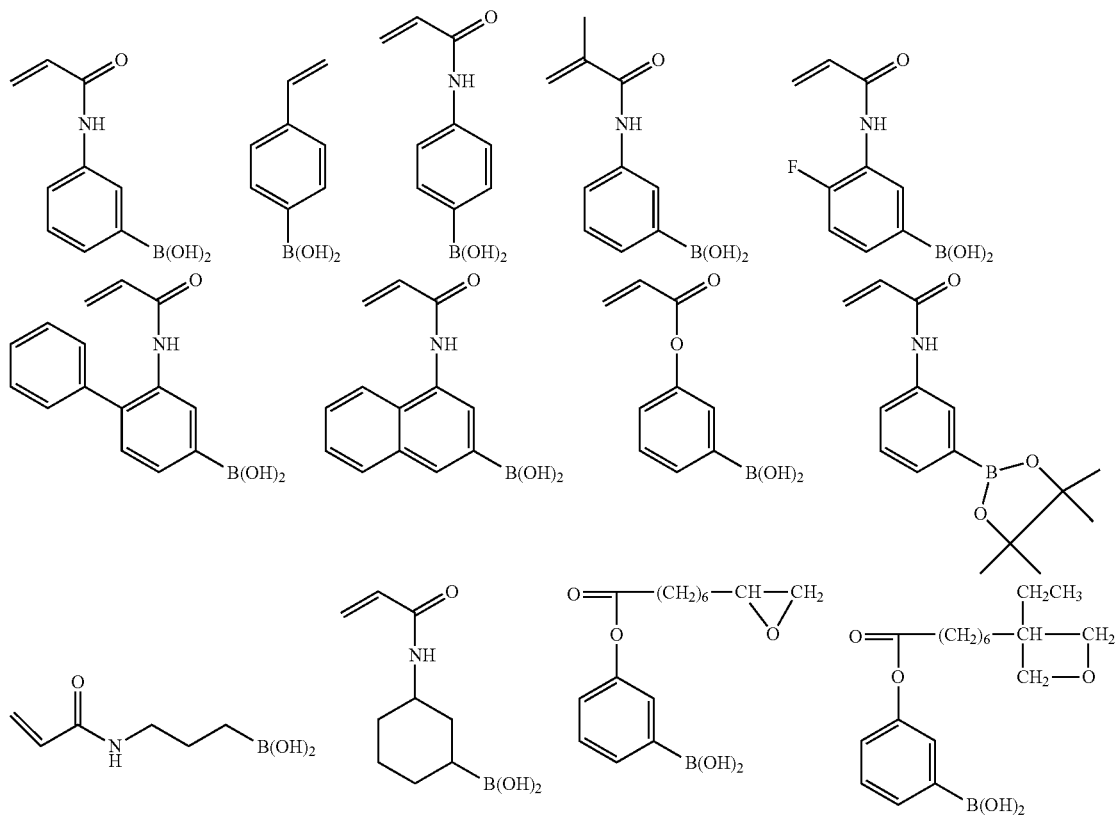

-continued
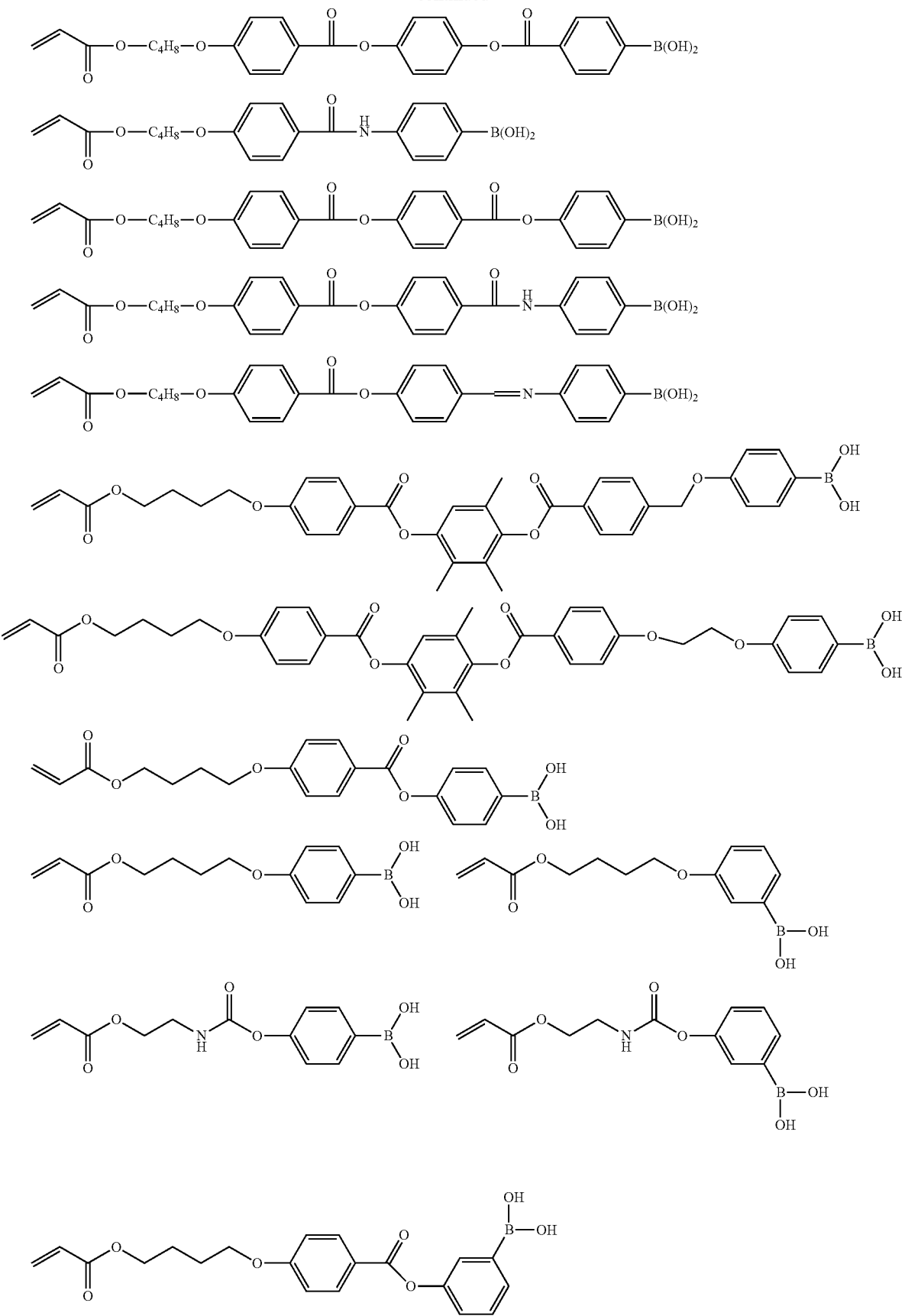

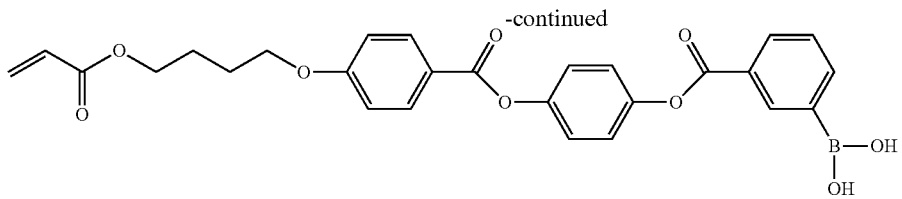

(Multifunctional Monomer)

The multifunctional monomer is a compound which is able to be polymerized by light or heat, and is a component configuring the resin layer by being polymerized and cured.

A plurality of polymerizable groups are included in the multifunctional monomer. The definition of the polymerizable group is as described above, and the (methyl)acryloyl group is preferable.

The number of polymerizable groups are included in the multifunctional monomer is not particularly limited, a plurality of (two or more) polymerizable groups may be included, and the number of polymerizable groups is preferably 3 to 32, and is more preferably 3 to 20, from the viewpoint of more excellent surface hardness of the polarizing plate.

Specific examples of the multifunctional monomer are able to include multifunctional (meth)acrylate obtained by performing an addition reaction of ethylene oxide or propylene oxide with respect to multifunctional alcohol such as ethylene glycol di(meth)acrylate, triethylene glycol di(meth)acrylate, tetramethylene glycol di(meth)acrylate, propylene glycol di(meth)acrylate, polyethylene glycol di(meth)acrylate, polypropylene glycol di(meth)acrylate, 1,3-butanediol di(meth)acrylate, trimethylol ethane triacrylate, trimethylol propane tri(meth)acrylate, trimethylol propane di(meth)acrylate, neopentyl glycol di(meth)acrylate, pentaerythritol tetra(meth)acrylate, pentaerythritol tri(meth)acrylate, pentaerythritol hexa(meth)acrylate, dipentaerythritol hexa(meth)acrylate, dipentaerythritol penta(meth)acrylate, hexanediol di(meth)acrylate, trimethylol propane tri(acryloyl oxy propyl) ether, tri(acryloyl oxy ethyl) isocyanurate, tri(acryloyl oxy ethyl) cyanurate, glycerin tri(meth)acrylate, trimethylol propane, or glycerin, and then by performing (meth)acrylation.

Only one type of the multifunctional monomer may be used, or two or more types thereof may be used in combination.

Further, the (meth)acrylate is the concept including both of acrylate and methacrylate.

A mass ratio of the boronic acid monomer and the multifunctional monomer described above is not particularly limited, and the mass ratio of the boronic acid monomer to the total mass of the boronic acid monomer and the multifunctional monomer (the mass of the boronic acid monomer/(the total mass of the boronic acid monomer and the multifunctional monomer)) is preferably 0.0005 mass % to 20.0 mass %, is more preferably 0.005 mass % to 11.0 mass %, and is even more preferably 0.05 mass % to 9.0 mass %, from the viewpoint of more excellent durability of the polarizer of the polarizing plate in high temperature high humidity conditions.

(Manufacturing Method of Resin Layer)

A manufacturing method of the resin layer is not particularly limited insofar as the resin layer which is directly in contact with the polarizer is able to be manufactured, and the resin layer is able to be manufactured by directly applying a composition for forming a resin layer containing the boronic acid monomer described above and the multifunctional monomer described above onto the polarizer, and by polymerizing and curing the composition, from the viewpoint of more easily controlling the thickness of the resin layer. In other words, an embodiment is preferable in which a coated film is formed by directly applying the composition for forming a resin layer onto the polarizer, a polymerizing and curing treatment is performed with respect to the coated film, and thus, the resin layer is manufactured.

Hereinafter, the embodiment using the composition for forming a resin layer will be described in detail.

The composition for forming a resin layer contains the boronic acid monomer described above and the multifunctional monomer described above. A mass ratio of the boronic acid monomer and the multifunctional monomer is not particularly limited, and it is preferable that the mass ratio satisfies the mass ratio of the boronic acid monomer (the mass of the boronic acid monomer/(the total mass of the boronic acid monomer and the multifunctional monomer)).

In addition, the composition for forming a resin layer may contain components other than the boronic acid monomer described above and the multifunctional monomer described above.

For example, the composition for forming a resin layer may contain a polymerization initiator.

The type of polymerization initiator is not particularly limited, and an optimal compound is suitably selected according to the type of polymerizing and curing. More specifically, examples of the polymerization initiator include a photopolymerization initiator and a thermal polymerization initiator.

Examples of the photopolymerization initiator include an alkyl phenone-based photopolymerization initiator, an acyl phosphine oxide-based photopolymerization initiator, a titanocene-based photopolymerization initiator, and the like. Examples of the thermal polymerization initiator include a ketone peroxide-based thermal polymerization initiator, a peroxy ketal-based thermal polymerization initiator, a hydroperoxide-based thermal polymerization initiator, a dialkyl peroxide-based thermal polymerization initiator, a diacyl peroxide-based thermal polymerization initiator, a peroxy dicarbonate-based thermal polymerization initiator, a peroxy ester-based thermal polymerization initiator, and the like.

The composition for forming a resin layer may contain various surfactants.

The surfactant is able to suppress film thickness unevenness due to a drying variation of local distribution of drying air, and to suppress surface concavities and convexities of the resin layer or a variation in a coating material (function as a leveling agent).

Specifically, a fluorine-based surfactant or a silicone-based surfactant is preferable as the surfactant. In addition, it is preferable that the surfactant is an oligomer or a polymer rather than a low molecular compound.

In a case where the surfactant is added, the surfactant is rapidly moved and unevenly distributed on the coated surface of a liquid film, and the surfactant is still unevenly distributed on the surface even after drying the film, and thus, the surface energy of the resin layer to which the surfactant is added decreases by the surfactant. It is preferable that the surface energy of the film is low from the viewpoint of preventing film thickness inhomogeneity or variation, and unevenness of the resin layer.

Preferred embodiments and specific examples of the fluorine-based surfactant are disclosed in paragraphs [0023] to [0080] of JP2007-102206A, and the same applies to the present invention.

Preferred examples of the silicone-based surfactant include a silicone-based surfactant having a substituent group on a terminal of a chain and/or on a side chain of a compound having a plurality of dimethyl silyloxy units as a repeating unit. A structural unit other than the dimethyl silyloxy unit may be included on the chain of the compound having a dimethyl silyloxy unit as a repeating unit. The substituent groups may be identical to each other or different from each other, and a plurality of substituent groups are preferable. Examples of a preferred substituent group include a group including a polyether group, an alkyl group, an aryl group, an aryloxy group, a cynnamoyl group, an oxetanyl group, a fluoroalkyl group, a polyoxy alkylene group, and the like.

Examples of a preferred silicone-based surfactant include "X-22-174DX", "X-22-2426", "X22-164C", and "X-22-176D" (all are product names) manufactured by Shin-Etsu Chemical Co., Ltd.; "FM-7725", "FM-5521", and "FM-6621" (all are product names) manufactured by CHISSO CORPORATION; "DMS-U22" and "RMS-033" (all are product names) manufactured by Gelest, Inc.; "SH200", "DC11PA", "ST80PA", "L7604", "FZ-2105", "L-7604", "Y-7006", and "SS-2801" (all are product names) manufactured by Dow Corning Toray Co., Ltd.; "TSF400" (Product Name) manufactured by Momentive Performance Materials Inc.; and the like, but are not limited thereto.

The molecular weight of the surfactant is not particularly limited, and is preferably less than or equal to 100,000, is more preferably less than or equal to 50,000, is particularly preferably 1,000 to 30,000, and is most preferably 1,000 to 20,000.

The content of the surfactant in the composition for forming a resin layer is not particularly limited, and the content of the surfactant with respect to the total mass of the resin layer to be formed is preferably adjusted to be 0.01 mass % to 0.5 mass %, and is more preferably adjusted to be 0.01 mass % to 0.3 mass %.

(Translucent Resin Particles)

In addition, in order to impart anti-glare characteristics (surface scattering properties) or internal scattering properties, various translucent resin particles are able to be used in the resin layer.

In the translucent resin particles, a variation in scattering properties decreases as a variation in a particle diameter becomes smaller, and a haze value is easily designed. Plastic beads are preferable as the translucent resin particles.

Organic particles are exemplified as the translucent resin particles, and polymethyl methacrylate particles (a refractive index of 1.49), cross-linking poly(acryl-styrene) copolymer particles (a refractive index of 1.54), melamine resin particles (a refractive index of 1.57), polycarbonate particles (a refractive index of 1.57), polystyrene particles (a refractive index of 1.60), cross-linking polystyrene particles (a refractive index of 1.61), polyvinyl chloride particles (a refractive index of 1.60), benzoguanamine-melamine formaldehyde particles (a refractive index of 1.68), and the like are used as the organic particles.

Among them, the cross-linking polystyrene particles, the cross-linking poly((meth)acrylate) particles, and the cross-linking poly(acryl-styrene) particles are preferably used, the refractive index of a resin component of the resin layer is adjusted according to the refractive index of each of the translucent resin particles selected from the particles described above, and thus, anti-glare characteristics (surface scattering properties) or internal scattering properties are able to be imparted. Further, an inside haze, a surface haze, and center line average roughness are able to be preferably attained.

A difference in the refractive indices between the resin component of the resin layer and the translucent resin particles (the refractive index of the translucent resin particles—the refractive index of the resin component in the resin layer) is preferably 0.001 to 0.030 as an absolute value. In a case where the difference in the refractive indices is in the range described above, problems such as blurred characters of the film, a decrease in dark room contrast, and cloudiness of the surface do not occur.

It is preferable that the average particle diameter (on the basis of volume) of the translucent resin particles is 0.5 μm to 20 μm. In a case where the average particle diameter is in the range described above, a scattering angle distribution of light is in a wide angle, and thus, blurred characters of a display do not occur.

In addition, two or more types of translucent resin particles having different particle diameters may be used in combination. The translucent resin particles having a larger particle diameter are able to impart anti-glare characteristics, and the translucent resin particles having a smaller particle diameter are able to reduce graininess of the surface.

When the translucent resin particles are formulated, it is preferable that the translucent resin particles are formulated in the total solid content of the resin layer such that the content is 3 mass % to 30 mass %. When the content is in the range described above, problems such as image blur or cloudiness or dazzling of the surface are able to be prevented.

In addition, in the image display device, a layer of low refractive index may be disposed on the resin layer arranged on a visible side. More preferably, a layer of intermediate refractive index and a layer of high refractive index may be disposed between the resin layer and the layer of low refractive index. By laminating a layer having a different refractive index on the resin layer, it is possible to increase antireflection properties.

Preferred embodiments and specific examples of the layer of low refractive index, the layer of intermediate refractive index, and the layer of high refractive index are disclosed in paragraphs [0237] to [0250] of JP2007-102206A, and the same applies to the present invention.

The composition for forming a resin layer may contain a solvent, as necessary. Examples of the solvent include water or an organic solvent.

In addition, various additives other than the additives described above are able to be added to the composition for forming a resin layer within a range not impairing the properties thereof. An ultraviolet absorbent, an antioxidant, a light stabilizer, an organic/mineral filler, a plasticizer, a flame retardant, a heat stabilizer, a lubricant, an antistatic agent, a release agent, a foaming agent, a nucleating agent, a coloring agent, a cross-linking agent, a dispersion aid, a leveling agent, a resin component, and the like are able to be exemplified as the various additives.

A method of applying the composition for forming a resin layer onto the polarizer is not particularly limited, and a known coating method is able to be adopted. Examples of the coating method include gravure coating, roll coating, reverse coating, knife coating, die coating, lip coating, doctor coating, extrusion coating, slide coating, wire bar coating, curtain coating, spinner coating, and the like.

In order to remove the solvent, a drying treatment may be performed with respect to a coating layer of the composition after applying the composition for forming a resin layer, as necessary. A drying treatment method is not particularly limited, and examples of the drying treatment method include an air drying treatment, a heating treatment, and the like.

A method of polymerizing and curing the coating layer of the composition obtained by the coating described above is not particularly limited, and examples of the method include a heating treatment, a light irradiation treatment, and the like.

The conditions of the heating treatment are different according to a material to be used, and a treatment of 40° C. to 120° C. (preferably 50° C. to 80° C.) for 0.5 minutes to 10 minutes (preferably 1 minute to 5 minutes) is preferable from the viewpoint of more excellent reaction efficiency.

The conditions of the light irradiation treatment are not particularly limited, and an ultraviolet ray irradiation method of generating and emitting an ultraviolet ray and performing photocuring is preferable. Examples of an ultraviolet ray lamp used in such a method include a metal halide lamp, a high pressure mercury lamp, a low pressure mercury lamp, a pulse type xenon lamp, a xenon/mercury mixed lamp, a low pressure sterilization lamp, and an electrodeless lamp. Among the ultraviolet ray lamps, it is preferable that the metal halide lamp or the high pressure mercury lamp is used.

In addition, irradiation conditions are different according to the conditions of each of the lamps, and in general, an irradiation exposure amount may be in a range of 20 mJ/cm$^2$ to 10000 mJ/cm$^2$, and it is preferable that the irradiation exposure amount is in a range of 100 mJ/cm$^2$ to 3000 mJ/cm$^2$.

The average thickness of the resin layer obtained by the treatment described above is not particularly limited, and is preferably 0.2 μm to 15 μm, and is more preferably 0.5 μm to 10 μm, from the viewpoint of handleability.

The film thickness is able to be measured by using an existing film thickness meter and reflective spectrographic film thickness meter (FE-3000, manufactured by OTSUKA ELECTRONICS Co., LTD.). Alternatively, the sectional surface of the resin layer may be directly measured by being observed using a microscope or SEM.

Further, the average thickness is a value obtained by measuring the thicknesses of arbitrary five or more points which are separated from each other by greater than or equal to 10 mm in the resin layer, and by performing arithmetic averaging with respect to the thicknesses.

In addition, the resin layer satisfies Expression (X) and Expression (Y) described below. Further, Expression (Y) indicates that the absolute value of Rth(550) is less than or equal to 10 nm, and in other words, indicates −10 nm≤Rth (550)≤10 nm.

$$Re(550) \leq 10 \text{ nm} \quad \text{Expression (X)}$$

$$|Rth(550)| \leq 10 \text{ nm} \quad \text{Expression (Y)}$$

Here, Re(550) indicates in-plane retardation (nm) at a wavelength of 550 nm, and Rth(550) indicates retardation (nm) in a thickness direction at a wavelength of 550 nm.

From the viewpoint of suppressing an influence on polarized light to be transmitted through the resin layer, Re(550) of the resin layer is preferably less than or equal to 5 nm, and is more preferably less than or equal to 3 nm. In addition, by the same reasons, |Rth(550)| of the resin layer is preferably less than or equal to 5 nm, and is more preferably less than or equal to 3 nm.

Re(550) and Rth(550) of the resin layer are able to be measured by using a retardation measurement device such as KOBRA 21ADH or WR (manufactured by Oji Scientific Instruments Co., Ltd.) and AXOSCAN (manufactured by AXOMETRICS Inc.), as a measurement method of Re(550) and Rth(550) of the resin layer.

The resin layer is a layer obtained by polymerizing and curing the boronic acid monomer described above and the multifunctional monomer described above, and may contain other components.

For example, the resin layer may not contain the ultraviolet absorbent.

A known ultraviolet absorbent is able to be used as the ultraviolet absorbent. Examples of the ultraviolet absorbent include a benzotriazole-based ultraviolet absorbent, a benzophenone-based ultraviolet absorbent, a phenyl salicylate ester-based ultraviolet absorbent, and a triazine-based ultraviolet absorbent.

The content of the ultraviolet absorbent in the resin layer is not particularly limited, and is preferably 2 mass % to 25 mass % with respect to the total mass of the resin layer, from the viewpoint of preventing the burst of the ultraviolet absorbent from the resin layer after being polymerized and cured, of increasing hardness of the resin layer, and of obtaining a balance between visibility and UV shielding properties.

The optical properties of the resin layer are not particularly limited, and in a case where the polarizing plate is used in the image display device, and the resin layer is arranged on the visible side, the maximum transmittance at a wavelength of 300 nm to 380 nm is preferably less than or equal to 15%, and is more preferably less than or equal to 10%, from the viewpoint of more excellent light resistance of the polarizer in the polarizing plate.

The maximum transmittance is able to be measured by using a spectrophotometer such as a spectrophotometer UV-3150 (manufactured by Shimadzu Corporation), as a measurement method of the maximum transmittance.

<Polarizing Plate and Application Thereof>

As described above, the polarizing plate of the present invention includes at least the polarizer and the resin layer.

In a case where the polarizing plate is included in the image display device, the resin layer may be arranged to be directed towards the visible side (an outer side), or may be arranged to be directed towards the opposite side (an inner side).

Further, other layers may be included within a range not impairing the effect of the present invention.

Figure 2:
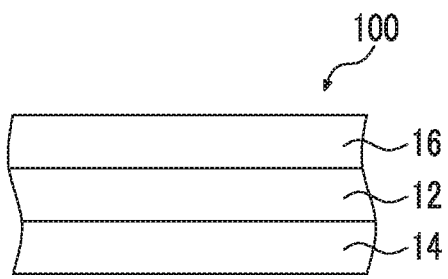
FIG. 2 is a sectional view of the other embodiment of the polarizing plate of the present invention.

For example, as illustrated in FIG. 2, the image display device may be a polarizing plate 100 in which a polarizer protective film 16 is arranged on the surface of the polarizer 12 on a side opposite to the resin layer 14 side.

In a case where the polarizing plate including the polarizer protective film is included in the image display device, it is preferable that the polarizer protective film is arranged to be directed towards the visible side (the outer side).

The optical properties of the polarizer protective film are not particularly limited, and in a case where the polarizing plate is used in the image display device, and the polarizer protective film is arranged on the visible side, the maximum transmittance of the polarizer protective film at a wavelength of 300 nm to 380 nm is preferably less than or equal to 15%, and is more preferably less than or equal to 7%, from the viewpoint of more excellent light resistance of the polarizer in the polarizing plate.

The configuration of the polarizer protective film is not particularly limited, and for example, the polarizer protective film may be a so-called transparent support or hard coat layer, or may be a laminated body of the transparent support and the hard coat layer.

A known layer is able to be used as the hard coat layer, and for example, the hard coat layer may be a layer obtained by polymerizing and curing the multifunctional monomer described above.

In addition, a known transparent support is able to be used as the transparent support, and for example, a cellulose-based polymer (hereinafter, referred to as cellulose acylate) represented by triacetyl cellulose, a thermoplastic norbornene-based resin (Zeonex and Zeonor manufactured by ZEON CORPORATION, Arton manufactured by JSR Corporation, and the like), an acrylic resin, and a polyester-based resin are able to be used as a material forming the transparent support.

The thickness of the polarizer protective film is not particularly limited, but is preferably less than or equal to 40 μm, and is more preferably less than or equal to 25 μm, from the reason for enabling the thickness of the polarizing plate to be thin.

By arranging the polarizing plate of the present invention in an optical path of the image display device, for example, on one side of at least one liquid crystal cell of a liquid crystal display device, or the like, it is possible to obtain the image display device of the present invention, for example, a liquid crystal display device. The liquid crystal display device has various modes according to the type of liquid crystal cell to be used, and in any case, the polarizing plate of the present invention is able to be used. For example, the polarizing plate of the present invention is able to be used in the liquid crystal display device of various modes such as a vertically aligned (VA) mode, an in-plane switching (IPS) mode, an optically compensated bend (OCB) mode, a twisted nematic (TN) mode, and a supertwisted nematic (STN) mode.

Further, a retardation film for improving view angle properties or contrast may be inserted between the polarizing plate of the present invention and the liquid crystal cell. The retardation film is different according to the type of liquid crystal cell to be used, and in a case of a VA mode, a negative-C-plate, an A-plate, a negative-C-plate, or the like is used as the retardation film, in a case of an IPS mode, a biaxial-plate, a positive-C-plate, or the like is used as the retardation film, in a case of a TN mode, a film formed by immobilizing a discotic liquid crystal which has been subjected to hybrid alignment, or the like is used as the retardation film, and in a case of a STN mode, a biaxial-plate, or the like is used as the retardation film.

EXAMPLES

The characteristics of the present invention will be more specifically described with reference to the following examples. Materials, use amounts, ratios, treatment contents, treatment procedures, and the like described in the following examples are able to be suitably changed unless otherwise deviated from the scope of the present invention. Therefore, the range of the present invention will not be narrowly interpreted by the following specific examples.

<Preparation of Film 28 with Hard Coat Layer>

(Preparation of Cellulose Ester Solution for Air Layer)

The following compositions were put into a mixing tank and were stirred while being heated, each component was dissolved, and thus, a cellulose ester solution for an air layer was prepared.

Composition of Cellulose Ester Solution for Air Layer

---

Cellulose Ester (Degree of Substitution of Acetyl of 2.86) 100 parts by mass

Sugar Ester Compound of Formula (R-I) 3 parts by mass

Sugar Ester Compound of Formula (R-II) 1 part by mass

Ultraviolet Absorbent Described below (Ultraviolet Absorbent X) 2.4 parts by weight Silica Particles Dispersion (Average Particle Diameter of 16 nm) "AEROSIL R972"

manufactured by NIPPON AEROSIL CO., LTD, 0.026 parts by mass

Methylene Chloride 339 parts by mass

Methanol 74 parts by mass

Butanol 3 parts by mass

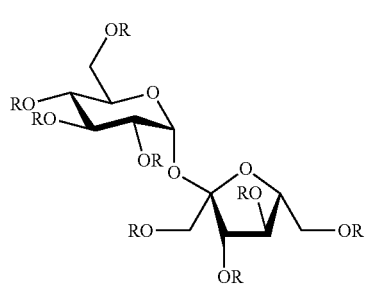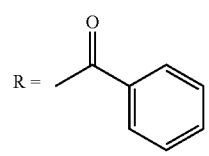

Formula (R-I)

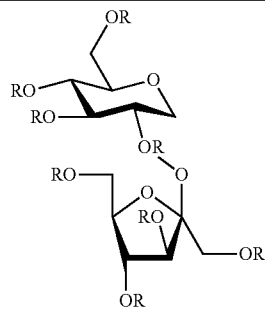

R = Acetate/i-Butylate (2/6)

Formula (R-II)

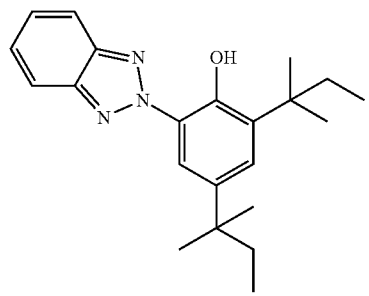 [SMILES: CCC(C)(C)c1cc(-n2nc3ccccc3n2)c(O)c(C(C)(C)CC)c1]

Ultraviolet Absorbent (Preparation of Cellulose Ester Solution for Drum Layer)

The following compositions were put into a mixing tank and were stirred while being heated, each component was dissolved, and thus, a cellulose ester solution for a drum layer was prepared.

Composition of Cellulose Ester Solution for Drum Layer

| | |
|---|---|
| Cellulose Ester (Degree of Substitution of Acetyl 2.86) | 100 parts by mass |
| Sugar Ester Compound of Formula (R-I) | 3 parts by mass |
| Sugar Ester Compound of Formula (R-II) | 1 parts by mass |
| Ultraviolet Absorbent X Described above | 2.4 parts by weight |
| Silica Particle Dispersion (average particle diameter 16 nm) "AEROSIL R972", manufactured by NIPPON AEROSIL CO., LTD. | 0.091 parts by mass |
| Methylene Chloride | 339 parts by mass |
| Methanol | 74 parts by mass |
| Butanol | 3 parts by mass |

(Preparation of Cellulose Ester Solution for Core Layer)

The following compositions were put into a mixing tank and were stirred while being heated, each component was dissolved, and thus, a cellulose ester solution for a core layer was prepared.

Composition of Cellulose Ester Solution for Core Layer

| | |
|---|---|
| Cellulose Ester (Degree of Substitution of Acetyl 2.86) | 100 parts by mass |
| Sugar Ester Compound of Formula (R-II) | 8.3 parts by mass |
| Sugar Ester Compound of Formula (R-II) | 2.8 parts by mass |
| Ultraviolet Absorbent X Described above | 2.4 parts by weight |
| Methylene Chloride | 266 parts by mass |
| Methanol | 58 parts by mass |
| Butanol | 2.6 parts by mass |

(Film Formation of Cocasting)

A device was used in which a feed block which had been adjusted for cocasting was provided as a casting die, and thus, a film having a three-layer structure was able to be molded. The cellulose ester solution for an air layer, the cellulose ester solution for a core layer, and the cellulose ester solution for a drum layer were cocast onto a drum which had been cooled to −7° C. from a casting port. At this time, the flow rate of each dope was adjusted such that a thickness ratio became the air layer/the core layer/the drum layer=7/90/3.

The dope was cast onto a mirror stainless steel support which was a drum having a diameter of 3 m. At this time, drying air at 34° C. was applied onto the drum at 270 m³/minute.

Then, a cellulose ester film which had been cast and rotated from an end point of a casting unit to the front by 50 cm was peeled off from the drum, and then, both ends of the film were clipped by a pin tenter. At the time of peeling, stretching of 5% was performed in a transportation direction (a longitudinal direction).

A cellulose ester web retained by the pin tenter was transported to a drying zone. In initial drying, drying air at 45° C. was blown, and then, drying was performed at 110° C. for 5 minutes. At this time, the cellulose ester web was transported while being stretched in a width direction at a stretching ratio of 10%.

In a case where the web was detached from the pin tenter, a portion retained by the pin tenter was continuously cut, and concavities and convexities having a width of 15 mm and a height of 10 μm were applied to both end portions of the web in the width direction. At this time, the width of the web was 1610 mm. Drying was performed at 140° C. for 10 minutes while applying tensile stress of 210 N in the transportation direction. Further, the end portions of the web in the width direction were continuously cut such that the web had a desired width, and thus, a cellulose ester film having a film thickness of 41 μm was prepared.

(Preparation of Hard Coat Layer)

The following curable resin compositions were prepared as a coating liquid for forming a hard coat layer.

(Curable Resin Composition)

| | |
|---|---|
| KAYARAD DPHA [manufactured by Nippon Kayaku Co., Ltd.] | 48.5 parts by mass |
| KAYARAD PET30 [manufactured by Nippon Kayaku Co., Ltd.] | 48.5 parts by mass |
| Irgacure 127: Polymerization Initiator [manufactured by BASF SE] | 3.0 parts by mass |
| Toluene | 97.0 parts by mass |
| Cyclohexane | 3.0 parts by mass |

The curable resin composition described above was applied onto the cellulose ester film prepared as described above in conditions of a transport speed of 30 m/minute by a die coating method using a slot die disclosed in Example 1 of JP2006-122889A, and was dried at 60° C. for 60 seconds. After that, a coating layer was cured by being irradiated with an ultraviolet ray having illuminance of 400 mW/cm$^2$ and irradiation dose of 390 mJ/cm$^2$ under nitrogen purge (an oxygen concentration of approximately 0.1%) by using an air-cooled metal halide lamp (manufactured by EYE GRAPHICS Co., Ltd.) of 160 W/cm, and was wound. The coating amount was adjusted such that the film thickness of the curing layer became 4 μm. Thus, a film 28 with a hard coat layer (hereinafter, simply referred to as a "film 28") having the total film thickness of 45 μm was prepared.

<Preparation of Film 29 with Hard Coat Layer>

(Preparation of Acrylic Film)

A pellet of [a mixture of 90 parts by mass of an acrylic resin having a lactone ring structure denoted by General Formula (R-III) described below {Mass Ratio of Copolymerization Monomer:Methyl Methacrylate/2-(Hydroxy Methyl) Methyl Acrylate=8/2, a lactone cyclization rate of approximately 100%, a content ratio of the lactone ring structure of 19.4%, a weight average molecular weight of 133000, a melting flow rate of 6.5 g/10 minutes (240° C., 10 kgf), and Tg of 131° C.}, 10 parts by mass of an acrylonitrile-styrene (AS) resin {Toyo AS AS20, manufactured by TOYO STYRENE CO., LTD.}, 4.5 parts by mass of ADK-STAB LA-F70 {manufactured by ADEKA CORPORATION}; Tg of 127° C.] was supplied to a biaxial extruder, and was melted and extruded into the shape of a sheet at a temperature of approximately 280° C., and thus, a rectangular acrylic film having a thickness of 20 μm was obtained.

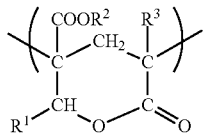

Formula (R-III)

In Formula (R-III) described above, $R^1$ represents a hydrogen atom, and $R^2$ and $R^3$ represent a methyl group.

(Preparation of Hard Coat Layer)

A hard coat layer in which the film thickness of a curing layer was 4 μm was applied onto an acrylic film by the same method as that of the film 28 with a hard coat layer except that the cellulose ester film was changed to the acrylic film prepared as described above in the film 28 with a hard coat layer. Thus, a film 29 with a hard coat layer (hereinafter, simply referred to as a "film 29") having the total film thickness of 24 μm was prepared.

<Polarizing Plate of Comparative Example 1>

The film 28 with a hard coat layer was prepared and was dipped in an aqueous solution of NaOH of 1.5 mol/L (a saponification liquid) held at 55° C. for 2 minutes, and after that, the film was washed with water. After that, the film was dipped in an aqueous solution of a sulphuric acid of 0.05 mol/L at 25° C. for 30 seconds, and then, water washing was performed under flowing water for 30 seconds, and thus, the film was in a neutral state. Then, water draining was repeated three times by using an air knife, the film was dried by being retained in a drying zone at 70° C. for 15 seconds after draining water, and thus, a film which had been subjected to a saponification treatment was prepared.

The saponified film 28 with a hard coat layer was bonded to a polarizer (polyvinyl alcohol-based resin contain polarizer) having a film thickness of 25 μm by using a polyvinyl alcohol-based adhesive agent, and was dried at 70° C. for greater than or equal to 10 minutes, and thus, a polarizing plate A was prepared. Here, the polarizer was arranged such that a transmission axis of the polarizer was orthogonal to the transportation direction of the film. Further, at the time of bonding, the film was bonded to the polarizer such that the film side of the film 28 with a hard coat layer was directed towards the polarizer side.

In the prepared polarizing plate A, a curable resin composition 4 described below was applied onto the surface of the polarizer on a side opposite to the film 28 with a hard coat layer side in conditions of a transport speed of 24 m/minute by a die coating method using a slot die disclosed in Example 1 of JP2006-122889A, and was dried at 60° C. for 60 seconds. After that, a coating layer was cured by being irradiated with an ultraviolet ray having illuminance of 400 mW/cm$^2$ and irradiation dose of 390 mJ/cm$^2$ under nitrogen purge (an oxygen concentration of approximately 0.1%) by using an air-cooled metal halide lamp (manufactured by EYE GRAPHICS Co., Ltd.) of 160 W/cm and was wound. The coating amount was adjusted such that the film thickness of the curing layer became 1 μm. Thus, a polarizing plate of Comparative Example 1 was prepared.

(Curable Resin Composition 4)

KAYARAD DPHA [manufactured by Nippon Kayaku Co., Ltd.] 47.5 parts by mass

A-TMMT [manufactured by Shin Nakamura Chemical CO., LTD.] 47.5 parts by mass

Irgacure 127: Polymerization Initiator [manufactured by BASF SE] 5.0 parts by mass Methyl Ethyl Ketone 100.0 parts by mass Comparative Examples 2 to 5 and Examples 1 to 12 and 36 to 38

As shown in Table 2 described below, polarizing plates of Comparative Examples 2 to 5 and Example 1 to 12 and 36 to 38 were prepared by the same method as that in Comparative Example 1 except that a curable resin composition shown in Table 1 described below was used instead of the curable resin composition 4, and the type of polarizer protective film and the thickness of the polarizer were changed as shown in Table 2 described below.

Further, the configurations of Examples 1 to 12 and 36 to 38 correspond to the configuration illustrated in FIG. 2, and the films 28 and 29 with a hard coat layer correspond to the polarizer protective film 16 in FIG. 2.

In Table 1, the numerical values shown in the section of "Composition" indicate parts by mass of the component.

Further, in each of the curable resin compositions, 100.0 parts by mass of methyl ethyl ketone is contained as a solvent.

In Table 1, DPHA, A-TMMT, and SP327 shown in the section of "[A] Multifunctional Monomer" respectively indicate the followings.

DPHA: KAYARAD DPHA [manufactured by Nippon Kayaku Co., Ltd.]

A-TMMT: A-TMMT [manufactured by Shin Nakamura Chemical CO., LTD.]

SP327: Compound described below manufactured by OSAKA ORGANIC CHEMICAL INDUSTRY LTD.

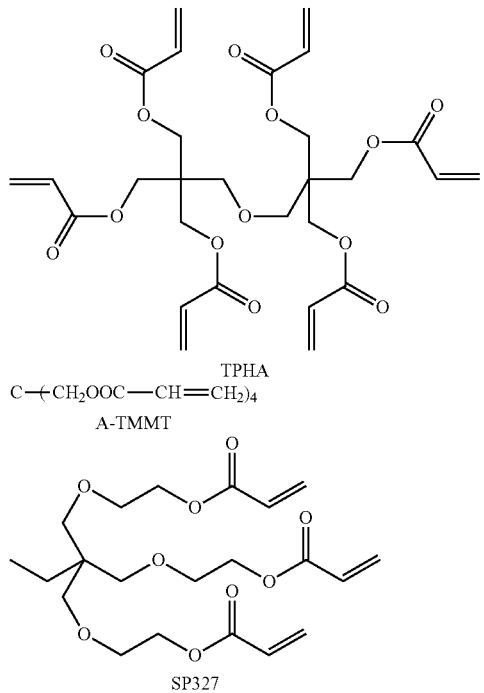

TPHA
C—(CH$_2$OOC—CH=CH$_2$)$_4$
A-TMMT

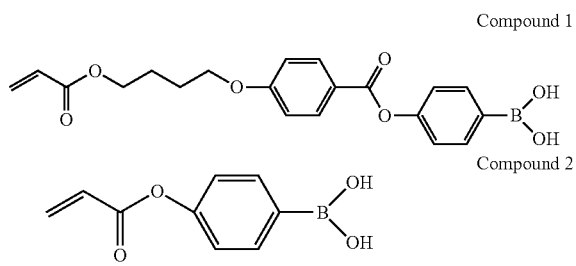

SP327

In Table 1, Compounds 1 to Compound 4 shown in the section of "[B] Boronic Acid Monomer" respectively indicate the following compounds.

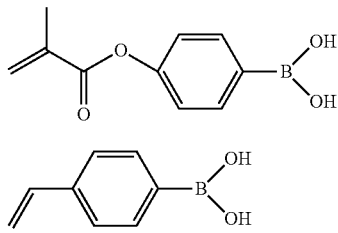

Compound 1

Compound 2

Compound 3

Compound 4

In Table 1, HBA and UV1700B shown in the section of "[C] Other Monomers" respectively indicate the following compounds.

HBA: 4-Hydroxy Butyl Acrylate (manufactured by Nippon Kasei Chemical Company Limited, Product Name of "HBA")

UV1700B: Polyurethane Acrylate (manufactured by The Nippon Synthetic Chemical Industry Co., Ltd., Product Name of "Ultraviolet Light UV-1700B")

In Table 1, Irg907 and Irg127 shown in the section of "[D] Polymerization Initiator" respectively indicate the following compounds.

Irg907: Irgacure 907 (manufactured by BASF SE)
Irg127: Irgacure 127 (manufactured by BASF SE)

In Table 1, Uvinul3050 and Tinuvin928 shown in the section of "[E] Ultraviolet Absorbent" respectively indicate the following compounds (manufactured by BASF SE).

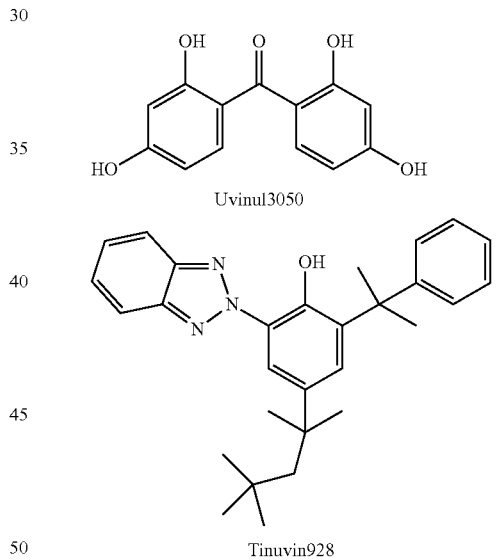

Uvinul3050

Tinuvin928

In Table 1, Compound 5 to Compound 7 shown in the section of "[F] Surfactant" indicate a copolymer having a repeating unit shown in Table 5 described below, at a content ratio (mol %) shown in Table 5 described below. A weight average molecular weight (Mw) is a measurement value of GPC measurement (in terms of polystyrene).

TABLE 5

| | Compound 5 | Compound 6 | Compound 7 |
|---|---|---|---|
| 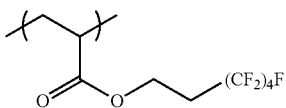 | 25 | | |

TABLE 5-continued

| | Compound 5 | Compound 6 | Compound 7 |
|---|---|---|---|
| 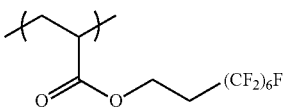 | 25 | | |
| 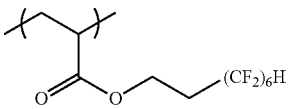 | | 90 | |
| 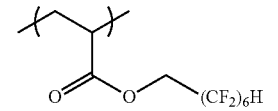 | | 90 | |
| 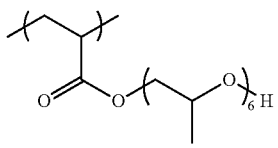 | | 10 | |
| 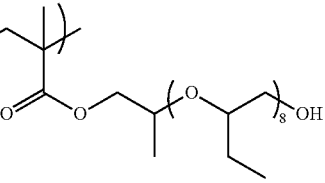 | 50 | | |
| 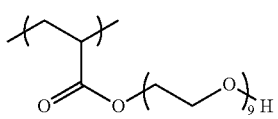 | | | |
| 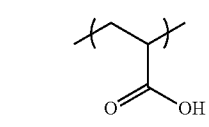 | | | 10 |
| Weight Average Molecular Weight (Mw) | 18000 | 13000 | 16000 |

In Table 1, the section of "[B]/[A]+[B]" indicates the mass ratio of the boronic acid monomer (the mass of the boronic acid monomer/(the total mass of the boronic acid monomer and the multifunctional monomer)).

In Table 1, the section of "Curing Layer" indicates irradiation dose at the time of forming a resin layer by using each curable resin composition, the film thickness of the resin layer formed of each of the curable resin compositions, the maximum transmittance of the resin layer formed of each of the curable resin compositions, and each of Re(550) and Rth(550) of the resin layer formed of each of the curable resin compositions.

The resin layer formed in each of the examples is manufactured to have a film thickness shown in Table 1.

The maximum transmittance of the resin layer formed of each of the curable resin compositions indicates the maximum transmittance at a wavelength of 300 nm to 380 nm, and the maximum transmittance was calculated by being measured by using UV-3150 (manufactured by Shimadzu Corporation).

Re(550) and Rth(550) of the resin layer formed of each of the curable resin compositions were measured by AXOSCAN (manufactured by AXOMETRICS Inc.).

Further, first, each of the curable resin compositions was applied onto PET having a thickness of 100 μm, and a coating layer was cured by being irradiated with an ultraviolet ray having illuminance of 400 mW/cm$^2$ and irradiation dose of 390 mJ/cm$^2$ under nitrogen purge (an oxygen concentration of approximately 0.1%) by using an air-cooled metal halide lamp (manufactured by EYE GRAPHICS Co., Ltd.) of 160 W/cm, and thus, a resin layer was formed, as a measurement method of the maximum transmittance, and Re(550) and Rth(550) of the resin layer. After that, the PET was peeled off, and the maximum transmittance, and Re(550) and Rth(550) only of the resin layer were measured. Further, only in a case of curable resin compositions 15, 16, and 34, the irradiation dose was changed to 850 mJ/cm$^2$. Further, the thickness of each resin layer (cured film) was measured by the film thickness (μm) shown in Table 1.

In Table 2, the section of "Type of Curable Resin Composition" indicates numbers of the curable resin compositions shown in Table 1.

In addition, the section of "Resin Layer" indicates the resin layer (the curing layer) obtained by the curable resin composition, and for example, the resin layer formed of the curable resin composition 1 indicates a curing layer 1.

In Table 2, the maximum transmittance of "Polarizer Protective Film" indicates the maximum transmittance of the film 28 or the film 29 at a wavelength of 300 nm to 380 nm, and the maximum transmittance was calculated by being measured by using UV-3150 (manufactured by Shimadzu Corporation).

TABLE 1

| | Composition (Part by Mass) | | | | | | | | | | | | | | | | | | Curing Layer | | | | |
|---|---|---|---|---|---|---|---|---|---|---|---|---|---|---|---|---|---|---|---|---|---|---|---|---|
| | [A] Multifunctional Monomer | | | [B] Boronic Acid Monomer | | | | [C] Other Monomers | | [D] Polymerization Initiator | | [E] Ultraviolet Absorbent | | [F] Surfactant | | | [B]/ ([A]+[B]) | Irradiation Dose (mJ) | Film Thickness (μm) | Maximum Transmittance (%) | Re (550) (nm) | Rth (550) (nm) |
| | DPHA | A-TMMT | SP327 | Compound 1 | Compound 2 | Compound 3 | Compound 4 | HBA | UV1700B | Irg907 | Irg127 | Uninul3050 | Tinuvin928 | Compound 5 | Compound 6 | Compound 7 | | | | | | | |
| Curable Resin Composition 1 | 54 | — | — | — | — | — | — | 23 | 18 | 5.0 | — | — | — | — | — | — | 0 | 390 | 1.0 | 92 | 0.1 | 0.9 |
| Curable Resin Composition 2 | 64 | — | — | — | — | — | — | 10 | 21 | 5.0 | — | — | — | — | — | — | 0 | 390 | 1.0 | 92 | 0.1 | 0.9 |
| Curable Resin Composition 3 | 71 | — | — | — | — | — | — | — | 24 | 5.0 | — | — | — | — | — | — | 0 | 390 | 1.0 | 92 | 0.0 | 1.0 |
| Curable Resin Composition 4 | 47.5 | 47.5 | — | — | — | — | — | — | — | — | 5.0 | — | — | — | — | — | 0 | 390 | 1.0 | 92 | 0.0 | 1.0 |
| Curable Resin Composition 5 | 40 | 40 | — | — | — | — | — | 15 | — | — | 5.0 | — | — | — | — | — | 0 | 390 | 1.0 | 92 | 0.0 | 0.9 |
| Curable Resin Composition 6 | 43.3 | 43.3 | — | 8.4 | — | — | — | — | — | — | 5.0 | — | — | — | — | — | 8.8 | 390 | 1.0 | 92 | 0.0 | 1.1 |
| Curable Resin Composition 7 | — | 94.9 | — | 0.1 | — | — | — | — | — | — | 5.0 | — | — | — | — | — | 0.1 | 390 | 1.0 | 92 | 0.0 | 0.7 |
| Curable Resin Composition 8 | 45 | 45 | — | 5.0 | — | — | — | — | — | — | 5.0 | — | — | — | — | — | 5.3 | 390 | 1.0 | 92 | 0.0 | 1.0 |
| Curable Resin Composition 9 | 45 | 45 | — | — | 5.0 | — | — | — | — | — | 5.0 | — | — | — | — | — | 5.3 | 390 | 1.0 | 92 | 0.1 | 1.0 |
| Curable Resin Composition 10 | 45 | 45 | — | — | — | 5.0 | — | — | — | — | 5.0 | — | — | — | — | — | 5.3 | 390 | 1.0 | 92 | 0.0 | 1.0 |
| Curable Resin Composition 11 | 40 | 40 | 10 | 5.0 | — | — | — | — | — | — | 5.0 | — | — | — | — | — | 5.3 | 390 | 1.0 | 92 | 0.1 | 0.9 |
| Curable Resin Composition 12 | 45 | 45 | — | — | — | — | 5.0 | — | — | — | 5.0 | — | — | — | — | — | 5.3 | 390 | 1.0 | 92 | 0.0 | 1.0 |
| Curable Resin Composition 13 | 42.5 | 42.5 | — | 10 | — | — | — | — | — | — | 5.0 | — | — | — | — | — | 10.5 | 390 | 1.0 | 92 | 0.0 | 1.0 |
| Curable Resin Composition 14 | 40 | 40 | — | 15 | — | — | — | — | — | — | 5.0 | — | — | — | — | — | 15.8 | 390 | 1.0 | 92 | 0.0 | 1.0 |
| Curable Resin Composition 15 | 41 | 41 | — | 4.5 | — | — | — | — | — | 4.5 | — | 9.0 | — | — | — | — | 5.2 | 850 | 8.0 | 6.8 | 0.0 | 4.2 |
| Curable Resin Composition 16 | 41.8 | 41.8 | — | 4.7 | — | — | — | — | — | 4.7 | — | 7.0 | — | — | — | — | 5.3 | 850 | 8.0 | 12 | 0.0 | 4.8 |
| Curable Resin Composition 17 | 47.5 | 47.5 | — | — | — | — | — | — | — | — | 5.0 | — | — | — | — | — | 0 | 390 | 8.0 | 92 | 0.0 | 7.8 |
| Curable Resin Composition 18 | 40 | 40 | — | — | — | — | — | 15 | — | — | 5.0 | — | — | — | — | — | 0 | 390 | 8.0 | 92 | 0.0 | 7.1 |
| Curable Resin Composition 19 | 43.3 | 43.3 | — | 8.4 | — | — | — | — | — | — | 5.0 | — | — | — | — | — | 8.8 | 390 | 8.0 | 92 | 0.0 | 8.4 |
| Curable Resin Composition 20 | — | 94.9 | — | 0.1 | — | — | — | — | — | — | 5.0 | — | — | — | — | — | 0.1 | 390 | 8.0 | 92 | 0.1 | 5.2 |
| Curable Resin Composition 21 | 45 | 45 | — | 5.0 | — | — | — | — | — | — | 5.0 | — | — | — | — | — | 5.3 | 390 | 8.0 | 92 | 0.0 | 7.9 |

TABLE 1-continued

| | Composition (Part by Mass) | | | | | | | | | | | | | | | | | Curing Layer | | | | |
|---|---|---|---|---|---|---|---|---|---|---|---|---|---|---|---|---|---|---|---|---|---|---|
| | [A] Multifunctional Monomer | | | [B] Boronic Acid Monomer | | | | [C] Other Monomers | | [D] Polymerization Initiator | | [E] Ultraviolet Absorbent | | [F] Surfactant | | | [B]/ ([A]+ [B]) | Irradiation Dose (mJ) | Film Thickness (μm) | Maximum Transmittance (%) | Re (550) (nm) | Rth (550) (nm) |
| | DPHA | A-TMMT | SP327 | Compound 1 | Compound 2 | Compound 3 | Compound 4 | HBA | UV1700B | Irg907 | Irg127 | Uninul3050 | Tinuvin928 | Compound 5 | Compound 6 | Compound 7 | | | | | | |
| Curable Resin Composition 22 | 45 | 45 | — | — | 5.0 | — | — | — | — | — | 5.0 | — | — | — | — | — | 5.3 | 390 | 8.0 | 92 | 0.0 | 8.0 |
| Curable Resin Composition 23 | 45 | 45 | — | — | — | 5.0 | — | — | — | — | 5.0 | — | — | — | — | — | 5.3 | 390 | 8.0 | 92 | 0.0 | 7.9 |
| Curable Resin Composition 24 | 40 | 40 | 10 | 5.0 | — | — | — | — | — | — | 5.0 | — | — | — | — | — | 5.3 | 390 | 8.0 | 92 | 0.1 | 7.6 |
| Curable Resin Composition 25 | 45 | 45 | — | — | — | — | 5.0 | — | — | — | 5.0 | — | — | — | — | — | 5.3 | 390 | 8.0 | 92 | 0.0 | 7.8 |
| Curable Resin Composition 26 | 42.5 | 42.5 | — | 10 | — | — | — | — | — | — | 5.0 | — | — | — | — | — | 10.5 | 390 | 8.0 | 92 | 0.1 | 7.8 |
| Curable Resin Composition 27 | 40 | 40 | — | 15 | — | — | — | — | — | — | 5.0 | — | — | — | — | — | 15.8 | 390 | 8.0 | 92 | 0.0 | 7.9 |
| Curable Resin Composition 28 | — | 100 | — | 0.5 | — | — | — | — | — | — | 3.0 | — | — | 0.2 | — | — | 0.5 | 390 | 8.0 | 92 | 0.0 | 1.4 |
| Curable Resin Composition 29 | — | 100 | — | 0.5 | — | — | — | — | — | — | 3.0 | — | — | — | 0.2 | — | 0.5 | 390 | 8.0 | 92 | 0.0 | 1.4 |
| Curable Resin Composition 30 | — | 100 | — | 0.5 | — | — | — | — | — | — | 3.0 | — | — | — | — | 0.2 | 0.5 | 390 | 8.0 | 92 | 0.0 | 1.4 |
| Curable Resin Composition 31 | — | 100 | — | 0.5 | — | — | — | — | — | — | 3.0 | — | — | 0.2 | — | — | 0.5 | 390 | 8.0 | 92 | 0.1 | 5.1 |
| Curable Resin Composition 32 | — | 100 | — | 0.5 | — | — | — | — | — | — | 3.0 | — | — | — | 0.2 | — | 0.5 | 390 | 8.0 | 92 | 0.1 | 5.1 |
| Curable Resin Composition 33 | — | 100 | — | 0.5 | — | — | — | — | — | — | 3.0 | — | — | — | — | 0.2 | 0.5 | 390 | 8.0 | 92 | 0.1 | 5.1 |
| Curable Resin Composition 34 | — | 100 | — | 0.5 | — | — | — | — | — | — | 3.0 | — | 11 | — | — | — | 0.5 | 850 | 8.0 | 6.8 | 0.1 | 4.4 |

TABLE 2

| | | Type of Curable Resin Composition | Configuration of Polarizing Plate | | | Evaluation | | | | WET Durability (60° C. 90% 42 d) | Light Resistance (Xe Irradiation 15 d) |
|---|---|---|---|---|---|---|---|---|---|---|---|
| | | | Polarizer Protective Film | Polarizer Thickness (μm) | Resin Layer | Polarizer Protective Film Maximum Transmittance | Resin Layer | | | | |
| | | | | | | | [B]/([A] + [B]) | Adhesiveness | Pencil Hardness | | |
| Comparative Example | 1 | 4 | Film 28 | 25 | Curing Layer 4 | 6.8% | 0 | 100/100 | —(3H) | — | — |
| | 2 | 1 | Film 28 | 25 | Curing Layer 1 | 6.8% | 0 | 0/100 | C(H) | — | — |
| | 3 | 2 | Film 28 | 25 | Curing Layer 2 | 6.8% | 0 | 100/100 | B(2H) | — | — |
| | 4 | 3 | Film 28 | 25 | Curing Layer 3 | 6.8% | 0 | 100/100 | A(3H) | — | — |
| | 5 | 5 | Film 28 | 25 | Curing Layer 5 | 6.8% | 0 | 100/100 | C(H) | — | — |
| Example | 1 | 6 | Film 28 | 25 | Curing Layer 6 | 6.8% | 8.8 | 0/100 | A(3H) | A | A |
| | 2 | 7 | Film 28 | 25 | Curing Layer 7 | 6.8% | 0.1 | 0/100 | A(3H) | A | A |
| | 3 | 8 | Film 28 | 25 | Curing Layer 8 | 6.8% | 5.3 | 0/100 | A(3H) | A | A |
| | 4 | 9 | Film 28 | 25 | Curing Layer 9 | 6.8% | 5.3 | 0/100 | A(3H) | A | A |
| | 5 | 10 | Film 28 | 25 | Curing Layer 10 | 6.8% | 5.3 | 0/100 | A(3H) | A | A |
| | 6 | 11 | Film 28 | 25 | Curing Layer 11 | 6.8% | 5.3 | 0/100 | A(3H) | A | A |
| | 7 | 12 | Film 28 | 25 | Curing Layer 12 | 6.8% | 5.3 | 4/100 | A(3H) | A | A |
| | 8 | 13 | Film 28 | 25 | Curing Layer 13 | 6.8% | 10.5 | 0/100 | B(2H) | B | A |
| | 9 | 14 | Film 28 | 25 | Curing Layer 14 | 6.8% | 15.8 | 0/100 | B(2H) | C | A |
| | 10 | 8 | Film 28 | 8 | Curing Layer 8 | 6.8% | 5.3 | 0/100 | A(3H) | A | A |
| | 11 | 7 | Film 29 | 25 | Curing Layer 7 | 6.9% | 0.1 | 0/100 | A(3H) | A | A |
| | 12 | 7 | Film 29 | 8 | Curing Layer 7 | 6.9% | 0.1 | 0/100 | A(3H) | A | A |
| | 36 | 28 | Film 29 | 8 | Curing Layer 28 | 6.9% | 0.5 | 0/100 | A(3H) | A | A |
| | 37 | 29 | Film 28 | 8 | Curing Layer 29 | 6.8% | 0.5 | 0/100 | A(3H) | A | A |
| | 38 | 30 | Film 28 | 8 | Curing Layer 30 | 6.8% | 0.5 | 0/100 | A(3H) | A | A |

The following various evaluations were performed by using the polarizing plates obtained in the examples and the comparative examples shown in Table 2. The results are collectively shown in Table 2.

(Adhesiveness)

The surface of the polarizing plate of each of the examples and comparative examples on a side opposite to the surface on which the resin layer was formed was bonded to a glass substrate through an adhesive agent having a thickness of approximately 20 μm, and thus, a sample was prepared, and the sample was left to stand under conditions of 25° C. and 60% RH for 2 days, and then, the surface of the resin layer in the polarizing plate was subjected to a crosscut peeling test based on JIS K 5400, and evaluation was performed by the number of peelings. Here, a peeling operation using tape was continuously performed with respect to the same sample two times, the total number of peeling of two peeling operations (the number of peelings after second peeling operation) was evaluated. Further, continuously performing the peeling operation two times indicates that the tape is bonded to and peeled off the sample, and then, the tape is further bonded to and peeled off from the same sample.

(Pencil Hardness)

Pencil hardness of the polarizing plate of each of the examples and comparative examples was obtained by a test method based on JIS K 5400(1990) using pencils having different hardness, and thus, relative evaluation was performed with respect to the result of the polarizing plate of Comparative Example 1. Evaluation criteria are as follows. In practice, A or B is preferable. Further, the pencil hardness was evaluated from a side on which the resin layer was arranged.

A: The hardness is identical to or greater than the hardness of Comparative Example 1.

B: The hardness is less than the hardness of Comparative Example 1 by one rank.

C: The hardness is less than the hardness of Comparative Example 1 by two ranks.

Further, in Table 2, in each of the sections, the results of specific hardness are shown in parentheses along with evaluation of A to C described above. For example, "(A (3H))" indicates that the evaluation is A and the specific hardness is 3H.

(WET Durability)

The resin layer in the polarizing plate of each of the examples and the comparative examples was bonded to a glass substrate through an adhesive agent, a sample was prepared, and the sample was left to stand under conditions of 60° C. and 90% RH for 42 days, and then, the degree of polarization of the polarizing plate was measured by using VAP-7070 (manufactured by JASCO CORPORATION). Further, the degree of polarization described above was measured three times, and the average value thereof was set to the degree of polarization of each of the polarizing plates.

In addition, a decreasing rate was obtained from the degree of polarization by the following expression using the polarizing plate of Comparative Example 1 as a comparative polarizing plate, and WET durability was evaluated on the basis of the following evaluation criteria. In practice, A or B is preferable.

Decreasing Rate (%)=Degree of Polarization (%) of Comparative Polarizing Plate after Durability Test−Degree of Polarization (%) of Polarizing Plate of Each Example (or Each Comparative Example) after Durability Test A: The decreasing rate is less than 0.02%.

B: The decreasing rate is greater than or equal to 0.02% and less than 0.05%.

C: The decreasing rate is greater than or equal to 0.05%.

(Light Resistance)

The resin layer of the polarizing plate of each of the examples and comparative examples was bonded to a glass substrate through an adhesive agent, a sample was prepared, and irradiation (150 W/cm$^2$, a super xenon weather meter SX75 (manufactured by Suga Test Instruments Co., Ltd.)) was performed from the polarizer protective film side of the sample for 15 days by using a xenon lamp, and then, the degree of polarization of the polarizing plate was measured by using VAP-7070 (manufactured by JASCO CORPORATION).

In addition, a decreasing rate was obtained from the degree of polarization by the following expression using the polarizing plate of Comparative Example 1 as a comparative polarizing plate, and light resistance was evaluated on the basis of the following evaluation criteria. In practice, A or B is preferable.

Decreasing Rate (%)=Degree Of Polarization (%) of Comparative Polarizing Plate after Light Resistance Test−Degree Of Polarization (%) of Polarizing Plate of Each Example (or Each Comparative Example) after Light Resistance Test A: The decreasing rate is less than 0.02%.

B: The decreasing rate is greater than or equal to 0.02% and less than 0.05%.

C: The decreasing rate is greater than or equal to 0.05%.

As shown in Table 2, the polarizing plate of the present invention exhibited excellent pencil hardness and excellent adhesiveness. In particular, in a case where the mass ratio of the boronic acid monomer (the mass of the boronic acid monomer/(the total mass of the boronic acid monomer and the multifunctional monomer)) is 0.005 mass % to 11.0 mass %, it was confirmed that the WET durability became more excellent.

In contrast, in the comparative examples not containing the boronic acid monomer, adhesiveness deteriorated.

Comparative Example 6

A curable resin composition 17 shown in Table 1 was applied onto a separately prepared polarizer (a polarizer containing a polyvinyl alcohol resin) having a film thickness of 25 μm in conditions of a transport speed of 24 m/minute by a die coating method using a slot die disclosed in Example 1 of JP2006-122889A, and was dried at 60° C. for 60 seconds. After that, a coating layer was cured by being irradiated with an ultraviolet ray having illuminance of 400 mW/cm$^2$ and irradiation dose of 390 mJ/cm$^2$ under nitrogen purge (an oxygen concentration of approximately 0.1%) by using an air-cooled metal halide lamp (manufactured by EYE GRAPHICS Co., Ltd.) of 160 W/cm, and was wound. The coating amount was adjusted such that the film thickness of the curing layer became 8 μm. Thus, a curing layer 17 was prepared on the polarizer.

Next, the curable resin composition 4 shown in Table 1 was applied onto the surface of the polarizer on a side opposite to the surface on which the curing layer 17 was disposed in conditions of a transport speed of 24 m/minute, and was dried at 60° C. for 60 seconds. After that, a coating layer was cured by being irradiated with an ultraviolet ray having illuminance of 400 mW/cm$^2$ and irradiation dose of 390 mJ/cm$^2$ under nitrogen purge (an oxygen concentration of approximately 0.1%) by using an air-cooled metal halide lamp (manufactured by EYE GRAPHICS Co., Ltd.) of 160 W/cm, and was wound. The coating amount was adjusted such that the film thickness of the curing layer became 1 μm. Thus, a polarizing plate of Comparative Example 6 was prepared.

Comparative Example 7 and Examples 13 to 24 and 39 to 42

As shown in Table 3 described below, polarizing plates of Comparative Example 7 and Examples 13 to 24 and 39 to 42 were prepared by the same method as that in Comparative Example 6 except that the curable resin composition shown in Table 1 described above was used instead of the curable resin composition 17 and the curable resin composition 4, and the thickness of the polarizer was changed.

Further, the configurations of Examples 13 to 24 and 39 to 42 correspond to that of an embodiment in which the resin layer is arranged on both surfaces of the polarizer.

In Table 3, the resin layer arranged on one surface of the polarizer is described as "First Protective Layer", and the resin layer arranged on the other surface is described as "Second Protective Layer".

Further, in general, in a case where the polarizing plate is used in the image display device, the first protective layer is arranged such that the first protective layer is directed towards a visible side (an outer side).

TABLE 3

| | | Type of Curable Resin Composition | | Configuration of Polarizing Plate | | | Evaluation | | | | | | | | |
|---|---|---|---|---|---|---|---|---|---|---|---|---|---|---|---|
| | | | | First Protective Layer | Polarizer | Second Protective Layer | First Protective Layer | | | | Second Protective Layer | | | WET Durability | Light Resistance |
| | | First Protective Layer | Second Protective Layer | (Outer Side) | Thickness (μm) | (Inner Side) | Maximum Transmittance | [B]/([A]+[B]) | Adhesiveness | Pencil Hardness | [B]/([A]+[B]) | Adhesiveness | Pencil Hardness | (60° C. 90% 42 d) | (Xe Irradiation 15 d) |
| Comparative Example | 6 | 17 | 4 | Curing Layer 17 | 25 | Curing Layer 4 | 92% | 0 | 100/100 | —(5H) | 0 | 100/100 | —(5H) | — | C |
| | 7 | 18 | 5 | Curing Layer 18 | 25 | Curing Layer 5 | 92% | 0 | 100/100 | C(3H) | 0 | 100/100 | C(3H) | — | — |
| Example | 13 | 21 | 6 | Curing Layer 21 | 25 | Curing Layer 6 | 92% | 5.3 | 0/100 | A(5H) | 8.8 | 0/100 | A(5H) | A | — |
| | 14 | 21 | 7 | Curing Layer 21 | 25 | Curing Layer 7 | 92% | 5.3 | 0/100 | A(5H) | 0.1 | 3/100 | A(5H) | A | — |
| | 15 | 21 | 8 | Curing Layer 21 | 25 | Curing Layer 8 | 92% | 5.3 | 0/100 | A(5H) | 5.3 | 0/100 | A(5H) | A | — |
| | 16 | 21 | 9 | Curing Layer 21 | 25 | Curing Layer 9 | 92% | 5.3 | 0/100 | A(5H) | 5.3 | 0/100 | A(5H) | A | — |
| | 17 | 21 | 10 | Curing Layer 21 | 25 | Curing Layer 10 | 92% | 5.3 | 0/100 | A(5H) | 5.3 | 0/100 | A(5H) | A | — |
| | 18 | 21 | 11 | Curing Layer 21 | 25 | Curing Layer 11 | 92% | 5.3 | 0/100 | A(5H) | 5.3 | 0/100 | A(5H) | A | — |
| | 19 | 21 | 12 | Curing Layer 21 | 25 | Curing Layer 12 | 92% | 5.3 | 0/100 | A(5H) | 5.3 | 3/100 | A(5H) | A | — |
| | 20 | 21 | 13 | Curing Layer 21 | 25 | Curing Layer 13 | 92% | 5.3 | 0/100 | A(5H) | 10.5 | 0/100 | A(5H) | B | — |
| | 21 | 21 | 14 | Curing Layer 21 | 25 | Curing Layer 14 | 92% | 5.3 | 0/100 | A(5H) | 15.8 | 0/100 | B(4H) | C | — |
| | 22 | 15 | 8 | Curing Layer 15 | 25 | Curing Layer 8 | 6.8% | 5.2 | 0/100 | A(5H) | 5.3 | 0/100 | A(5H) | A | A |
| | 23 | 16 | 8 | Curing Layer 16 | 25 | Curing Layer 8 | 12% | 5.3 | 0/100 | A(5H) | 5.3 | 0/100 | A(5H) | A | B |

TABLE 3-continued

| | Type of Curable Resin Composition | | Configuration of Polarizing Plate | | | | Evaluation | | | | | | | |
|---|---|---|---|---|---|---|---|---|---|---|---|---|---|---|
| | | | First Protective Layer | Polarizer | Second Protective Layer | | First Protective Layer | | | | Second Protective Layer | | | Light Resistance |
| | First Protective Layer | Second Protective Layer | (Outer Side) | Thickness (μm) | (Inner Side) | Maximum Transmittance | [B]/([A]+[B]) | Adhesiveness | Pencil Hardness | [B]/([A]+[B]) | Adhesiveness | Pencil Hardness | WET Durability (60° C. 90% 42 d) | (Xe Irradiation 15 d) |
| 24 | 16 | 8 | Curing Layer 16 | 8 | Curing Layer 8 | 12% | 5.3 | 0/100 | A(5H) | 5.3 | 0/100 | A(5H) | A | B |
| 39 | 31 | 28 | Curing Layer 31 | 8 | Curing Layer 28 | 92% | 0.5 | 0/100 | A(5H) | 0.5 | 0/100 | A(5H) | A | — |
| 40 | 32 | 29 | Curing Layer 32 | 8 | Curing Layer 29 | 92% | 0.5 | 0/100 | A(5H) | 0.5 | 0/100 | A(5H) | A | — |
| 41 | 33 | 30 | Curing Layer 33 | 8 | Curing Layer 30 | 92% | 0.5 | 0/100 | A(5H) | 0.5 | 0/100 | A(5H) | A | — |
| 42 | 34 | 30 | Curing Layer 34 | 8 | Curing Layer 30 | 6.8% | 0.5 | 0/100 | A(5H) | 0.5 | 0/100 | A(5H) | A | A |

Various evaluations were performed by using the polarizing plates obtained in the examples and the comparative examples shown in Table 3. The results are collectively shown in Table 3. An evaluation method is as described above.

Further, the pencil hardness in the section of "First Protective Layer" and the section of "Second Protective Layer" was evaluated from a side on which each of the resin layers was arranged. In addition, the evaluation was performed by using the polarizing plate of Comparative Example 6 instead of the polarizing plate of Comparative Example 1. That is, the evaluation was performed on the basis of the following determination criteria.

A: The hardness is identical to or greater than the hardness of Comparative Example 6.
B: The hardness is less than the hardness of Comparative Example 6 by one rank.
C: The hardness is less than the hardness of Comparative Example 6 by two ranks.

Further, the determination described above was performed by being divided into the first protective layer side and the second protective layer side. That is, the first protective layer of each of the examples was compared to the curing layer 17 of Comparative Example 6, and the second protective layer of each of the examples was compared to a curing layer 4 of Comparative Example 6.

In addition, in the evaluation of (WET Durability) described above, the second protective layer in the polarizing plate of each of the examples and the comparative examples was bonded to a glass substrate through an adhesive agent, a sample was prepared, and the sample was used. In addition, the WET durability of Table 3 was evaluated by using the polarizing plate of Comparative Example 6 as a comparative polarizing plate instead of the polarizing plate of Comparative Example 1.

Further, in the evaluation of (Light Resistance) described above, the second protective layer in the polarizing plate of each of the examples and the comparative examples was bonded to the glass substrate through an adhesive agent, a sample was prepared, and irradiation was performed from the first protective layer side of the sample by using a xenon lamp. Further, the light resistance of Table 3 was evaluated by using the polarizing plate of Comparative Example 1 as a comparative polarizing plate, as with Table 2.

As shown in Table 3, the polarizing plate of the present invention exhibited excellent pencil hardness and excellent adhesiveness.

In contrast, in the comparative examples not containing the boronic acid monomer, adhesiveness deteriorated.

Comparative Example 8

A curable resin composition 17 shown in Table 1 was applied onto a separately prepared polarizer (a polarizer containing a polyvinyl alcohol resin) having a film thickness of 25 μm in conditions of a transport speed of 24 m/minute by a die coating method using a slot die disclosed in Example 1 of JP2006-122889A, and was dried at 60° C. for 60 seconds. After that, a coating layer was cured by being irradiated with an ultraviolet ray having illuminance of 400 mW/cm$^2$ and irradiation dose of 390 mJ/cm$^2$ under nitrogen purge (an oxygen concentration of approximately 0.1%) by using an air-cooled metal halide lamp (manufactured by EYE GRAPHICS Co., Ltd.) of 160 W/cm, and was wound. The coating amount was adjusted such that the film thickness of the curing layer became 8 μm. Thus, a polarizing plate of Comparative Example 8 was prepared.

<Polarizing Plates of Comparative Example 9 and Example 25 to 35 and 43 to 46>

As shown in Table 4 described below, polarizing plates of Comparative Example 9 and Examples 25 to 35 and 43 to 46 were prepared by the same method as that in Comparative Example 8 except that a curable resin composition disclosed in Table 1 described above was used instead of the curable resin composition 17 and the thickness of the polarizer was changed.

Further, the configurations of Examples 25 to 35 and 43 to 46 correspond to the configuration illustrated in FIG. 1.

TABLE 4

|  |  | Type of Curable Resin Composition | Configuration of Polarizing Plate | | Evaluation | | | | | |
|---|---|---|---|---|---|---|---|---|---|---|
|  |  |  | Resin Layer | Polarizer Thickness (μm) | Resin Layer | | | | WET Durability 60° C. 90% 42 d | Light Resistance (Xe Irradiation 15 d) |
|  |  |  |  |  | Maximum Transmittance | [B]/ ([A] + [B]) | Adhesiveness | Pencil Hardness |  |  |
| Comparative Example | 8 | 17 | Curing Layer 17 | 25 | 92% | 0 | 100/100 | —(5H) | — | C |
|  | 9 | 18 | Curing Layer 18 | 25 | 92% | 0 | 100/100 | C(3H) | — | — |
| Example | 25 | 19 | Curing Layer 19 | 25 | 92% | 8.8 | 0/100 | A(5H) | A | — |
|  | 26 | 20 | Curing Layer 20 | 25 | 92% | 0.1 | 2/100 | A(5H) | A | — |
|  | 27 | 21 | Curing Layer 21 | 25 | 92% | 5.3 | 0/100 | A(5H) | A | — |
|  | 28 | 22 | Curing Layer 22 | 25 | 92% | 5.3 | 0/100 | A(5H) | A | — |

TABLE 4-continued

| | Type of Curable Resin Composition | Configuration of Polarizing Plate | | Evaluation | | | | | |
|---|---|---|---|---|---|---|---|---|---|
| | | | Polarizer Thickness (μm) | Resin Layer | | | | WET Durability 60° C. 90% 42 d) | Light Resistance (Xe Irradiation 15 d) |
| | | Resin Layer | | Maximum Transmittance | [B]/ ([A] + [B]) | Adhesiveness | Pencil Hardness | | |
| 29 | 23 | Curing Layer 23 | 25 | 92% | 5.3 | 0/100 | A(5H) | A | — |
| 30 | 24 | Curing Layer 24 | 25 | 92% | 5.3 | 0/100 | A(5H) | A | — |
| 31 | 25 | Curing Layer 25 | 25 | 92% | 5.3 | 1/100 | A(5H) | A | — |
| 32 | 26 | Curing Layer 26 | 25 | 92% | 10.5 | 0/100 | B(4H) | B | — |
| 33 | 27 | Curing Layer 27 | 25 | 92% | 15.8 | 0/100 | B(4H) | C | — |
| 34 | 16 | Curing Layer 16 | 25 | 12% | 5.3 | 0/100 | A(5H) | A | B |
| 35 | 16 | Curing Layer 16 | 8 | 12% | 5.3 | 0/100 | A(5H) | A | B |
| 43 | 31 | Curing Layer 31 | 8 | 92% | 0.5 | 0/100 | A(5H) | A | — |
| 44 | 32 | Curing Layer 32 | 8 | 92% | 0.5 | 0/100 | A(5H) | A | — |
| 45 | 33 | Curing Layer 33 | 8 | 92% | 0.5 | 0/100 | A(5H) | A | — |
| 46 | 34 | Curing Layer 34 | 8 | 6.8% | 0.5 | 0/100 | A(5H) | A | A |

Various evaluations were performed by using the polarizing plates obtained in the examples and the comparative examples shown in Table 4. The results are collectively shown in Table 4. An evaluation method is as described above.

Further, the pencil hardness in the section of "Resin Layer" was evaluated from a side on which the resin layer was arranged. In addition, the evaluation was performed by using the polarizing plate of Comparative Example 8 instead of the polarizing plate of Comparative Example 1. That is, the evaluation was performed on the basis of the following determination criteria.

A: The hardness is identical to or greater than the hardness of Comparative Example 8.
B: The hardness is less than the hardness of Comparative Example 8 by one rank.
C: The hardness is less than the hardness of Comparative Example 8 by two ranks.

In addition, in the evaluation of (WET Durability), the polarizer in the polarizing plate of each of the examples and the comparative examples was bonded to a glass substrate through an adhesive agent, a sample was prepared, and the sample was used. In addition, the WET durability of Table 4 was evaluated by using the polarizing plate of Comparative Example 8 as a comparative polarizing plate instead of the polarizing plate of Comparative Example 1.

Further, in the evaluation of (Light Resistance) described above, the polarizer in the polarizing plate each of the examples and the comparative examples was bonded to a glass substrate through an adhesive agent, a sample was prepared, and irradiation was performed from the resin layer side of the sample by using a xenon lamp. Further, the light resistance in Table 4 was evaluated by using the polarizing plate of Comparative Example 1 as a comparative polarizing plate, as with Table 2.

As shown in Table 4, the polarizing plate of the present invention exhibited excellent pencil hardness and excellent adhesiveness.

In contrast, in the comparative examples not containing the boronic acid monomer, adhesiveness deteriorated.

EXPLANATION OF REFERENCES

10, 100: polarizing plate
12: polarizer
14: resin layer
16: polarizer protective film

What is claimed is:

1. An image display device, comprising a polarizing plate, comprising: a polarizer; and a resin layer directly in contact with the polarizer, wherein the resin layer is a layer obtained by polymerizing and curing a boronic acid monomer having a boronic acid group denoted by Formula (1) and a polymerizable group, and a multifunctional monomer, Re(550) and Rth(550) of the resin layer respectively satisfy Expression (X) and Expression (Y) described below, $Re(550) \leq 10$ nm     Expression (X)

$|Re(550)| \leq 10$ nm     Expression (Y)

Re(550) indicates in-plane retardation (nm) at a wavelength of 550 nm, and Rth(550) indicates retardation (nm) in a thickness direction at a wavelength of 550 nm, and

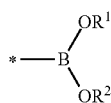

Formula (1)

in Formula (1), $R^1$ and $R^2$ each independently represent a hydrogen atom, a substituted or unsubstituted aliphatic hydrocarbon group, an aryl group, or a heterocyclic group, $R^1$ and $R^2$ may be connected to each other to form a ring, and * indicates a bonding position, wherein a thickness of the polarizer is from 3 μm to 35 μm.

2. The image display device according to claim 1, wherein a mass ratio of the boronic acid monomer to the total mass of the boronic acid monomer and the multifunctional monomer (a mass of the boronic acid monomer/(the total mass of the boronic acid monomer and the multifunctional monomer)) is 0.005 mass % to 11.0 mass %.

3. The image display device according to claim 2, wherein the polymerizable group included in the multifunctional monomer is a (meth)acryloyl group.

4. The image display device according to claim 2, wherein the resin layer further contains an ultraviolet absorbent.

5. The image display device according to claim 2, wherein maximum transmittance of the resin layer at a wavelength of 300 nm to 380 nm is less than or equal to 15%.

6. The image display device according to claim 2, further comprising:
a polarizer protective film on a surface of the polarizer on a side opposite to the resin layer side,
wherein maximum transmittance of the polarizer protective film at a wavelength of 300 nm to 380 nm is less than or equal to 15%.

7. The image display device according to claim 1, wherein the polymerizable group included in the multifunctional monomer is a (meth)acryloyl group.

8. The image display device according to claim 7, wherein the resin layer further contains an ultraviolet absorbent.

9. The image display device according to claim 7, wherein maximum transmittance of the resin layer at a wavelength of 300 nm to 380 nm is less than or equal to 15%.

10. The image display device according to claim 7, further comprising:
a polarizer protective film on a surface of the polarizer on a side opposite to the resin layer side,
wherein maximum transmittance of the polarizer protective film at a wavelength of 300 nm to 380 nm is less than or equal to 15%.

11. The image display device according to claim 1, wherein the resin layer further contains an ultraviolet absorbent.

12. The image display device according to claim 11, wherein maximum transmittance of the resin layer at a wavelength of 300 nm to 380 nm is less than or equal to 15%.

13. The image display device according to claim 11, further comprising:
a polarizer protective film on a surface of the polarizer on a side opposite to the resin layer side,
wherein maximum transmittance of the polarizer protective film at a wavelength of 300 nm to 380 nm is less than or equal to 15%.

14. The image display device according to claim 1, wherein maximum transmittance of the resin layer at a wavelength of 300 nm to 380 nm is less than or equal to 15%.

15. The image display device according to claim 1, further comprising:
a polarizer protective film on a surface of the polarizer on a side opposite to the resin layer side,
wherein maximum transmittance of the polarizer protective film at a wavelength of 300 nm to 380 nm is less than or equal to 15%.

16. The image display device according to claim 1, wherein the image display device is a liquid crystal display device.

17. A polarizing plate, comprising:
a polarizer; and
a resin layer directly in contact with the polarizer,
wherein the resin layer is a layer obtained by polymerizing and curing a boronic acid monomer having a boronic acid group denoted by Formula (1) and a polymerizable group, and a multifunctional monomer,
Re(550) and Rth(550) of the resin layer respectively satisfy Expression (X) and Expression (Y) described below, $Re(550) \leq 10$ nm     Expression (X)

$|Rth(550)| \leq 10$ nm     Expression (Y)

a thickness of the polarizer is less than or equal to 35 μm,
Re(550) indicates in-plane retardation (nm) at a wavelength of 550 nm, and Rth(550) indicates retardation (nm) in a thickness direction at a wavelength of 550 nm, and

Formula (1)

in Formula (1), $R^1$ and $R^2$ each independently represent a hydrogen atom, a substituted or unsubstituted aliphatic hydrocarbon group, an aryl group, or a heterocyclic group, $R^1$ and $R^2$ may be connected to each other to form a ring, and * indicates a bonding position, and
wherein a mass ratio of the boronic acid monomer to the total mass of the boronic acid monomer and the multifunctional monomer (a mass of the boronic acid monomer/(the total mass of the boronic acid monomer and the multifunctional monomer)) is 0.005 mass % to 11.0 mass %.

* * * * *